US00RE49688E

(19) United States
(12) Reissued Patent
Lin

(10) Patent Number: US RE49,688 E
(45) Date of Reissued Patent: Oct. 10, 2023

(54) CLIP COVER FOR C-TYPE LIGHT STRING

(71) Applicant: Chin-San Lin, Taipei (TW)

(72) Inventor: Chin-San Lin, Taipei (TW)

(73) Assignee: Chin-San Lin, Taipei (TW)

(21) Appl. No.: 16/974,027

(22) Filed: Sep. 14, 2020

Related U.S. Patent Documents

Reissue of:
(64) Patent No.: 10,100,986
Issued: Oct. 16, 2018
Appl. No.: 14/845,288
Filed: Sep. 4, 2015

(51) Int. Cl.
*F21S 4/10* (2016.01)
*F21V 21/00* (2006.01)
*F21V 23/00* (2015.01)
*F21V 27/00* (2006.01)

(52) U.S. Cl.
CPC ..... *F21S 4/10* (2016.01); *F21V 23/002* (2013.01); *F21V 27/00* (2013.01)

(58) Field of Classification Search
CPC ..... F21V 27/00; F21V 23/002; F21S 4/10
See application file for complete search history.

(56) References Cited

U.S. PATENT DOCUMENTS 1,843,389 A * 2/1932 Fischer ..... F21S 4/10 362/249.01
2,505,518 A * 4/1950 Benander ..... H01R 33/9555 200/252
5,514,006 A * 5/1996 Getselis ..... H01R 33/9555 200/51.17
5,526,250 A * 6/1996 Ting ..... H01R 25/142 362/652
5,626,415 A * 5/1997 Huang ..... F21V 17/06 362/267
6,142,429 A * 11/2000 Ahroni ..... F21V 21/088 248/68.1
7,118,249 B2 * 10/2006 Hsu ..... F21V 21/08 362/249.06
7,241,032 B2 * 7/2007 Qingbiao ..... F21V 3/00 362/382
8,070,347 B1 * 12/2011 Lin ..... F21S 4/10 362/656
8,480,278 B2 * 7/2013 Wasem ..... F21S 2/00 362/654
2017/0138577 A1 * 5/2017 Lin ..... F21V 23/002

* cited by examiner

*Primary Examiner* — James A Menefee
(74) *Attorney, Agent, or Firm* — Eastwind Consultants Co., Ltd.; Jenny Chen

(57) ABSTRACT

A clip cover for a C-type light string is an auxiliary accessory exclusively used for a C-type light string, and mainly includes a wire cover constituted by first front, rear covers, a lamp cover constituted by second front, rear covers and a buddle cover. Electric wire segments at the two sides of one C-type lamp of the light string are clipped inside the wire cover by engaging the first front cover with the first rear cover. Thereafter, the electric wire is pulled downward from the wire cover a certain length, allowing the C-type lamp to be hung perpendicularly below the wire cover; the lamp socket of the C-type lamp together with a small section of bent electric wire is further clipped inside the lamp cover through the second front, rear covers of the lamp cover; and the bundle cover is finally put around the lamp cover tightly.

12 Claims, 4 Drawing Sheets

CLIP COVER FOR C-TYPE LIGHT STRING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

(a) TECHNICAL FIELD OF THE INVENTION

The present invention relates to a coordinate component structure for a Christmas light strung, and more particularly to a clip cover component exclusively used for a C-type Christmas light string.

(b) DESCRIPTION OF THE PRIOR ART

General C-type light strings, as FIG. 1 shows, are formed by connecting a plurality of C-type lamps 20, each of which is composed of a lamp socket 21 and a lamp bulb 22 and separated from another with a distance, to a long electric wire 10. When the c-type light string is hung, all the C-type lamps 20 on the light string are at the same height. As such, the light string arranged in this way is somewhat monotonic and dull, and thus, cannot be used multi-functionally.

SUMMARY OF THE INVENTION

A clip cover for a C-type light string according to the present invention is an auxiliary accessory exclusively used for a C-type light string, and mainly includes a wire cover constituted by first front, rear covers, a lamp cover constituted by second front, rear covers, and a buddle covet Electric wire segments at the two sides of one C-type lamp of the light string are clipped inside the wire cover by engaging the first front cover with the first rear cover. Thereafter, the electric wire is pulled downward from the wire cover a certain length, allowing the C-type lamp to be hung perpendicularly under the wire cover; next, the lamp socket of the C-type lamp together with a small section of bent electric wire is further clipped inside the lamp cover through the second front, rear covers of the lamp cover; and the bundle cover is finally put around the lamp cover tightly. Whereby, the clip cover structure allows some C-type lamps on a C-type light string to be hung perpendicularly at different heights, thereby varying the monotonic C-type light string to become a curtain-like light string, and thereby to add a multiple use performance to the C-type light string.

DETAILED DESCRIPTION OF THE PREFERRED EMBODIMENTS

Figure 1:
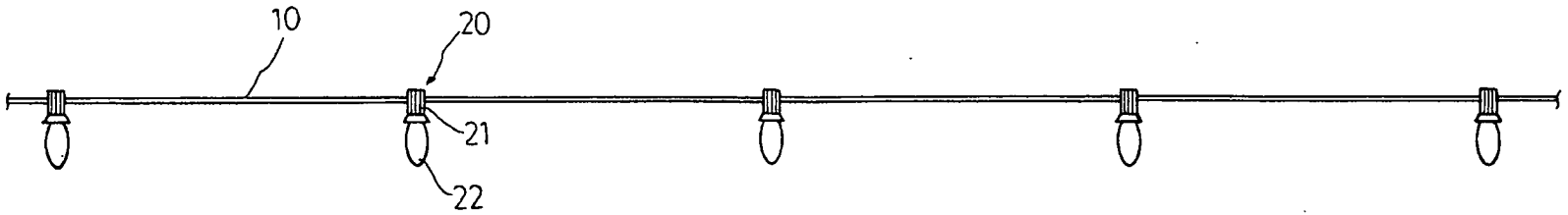
PRIOR ART FIG. 1
FIG. 1 is a schematic view of a conventional C-type light string.
Figure 2:
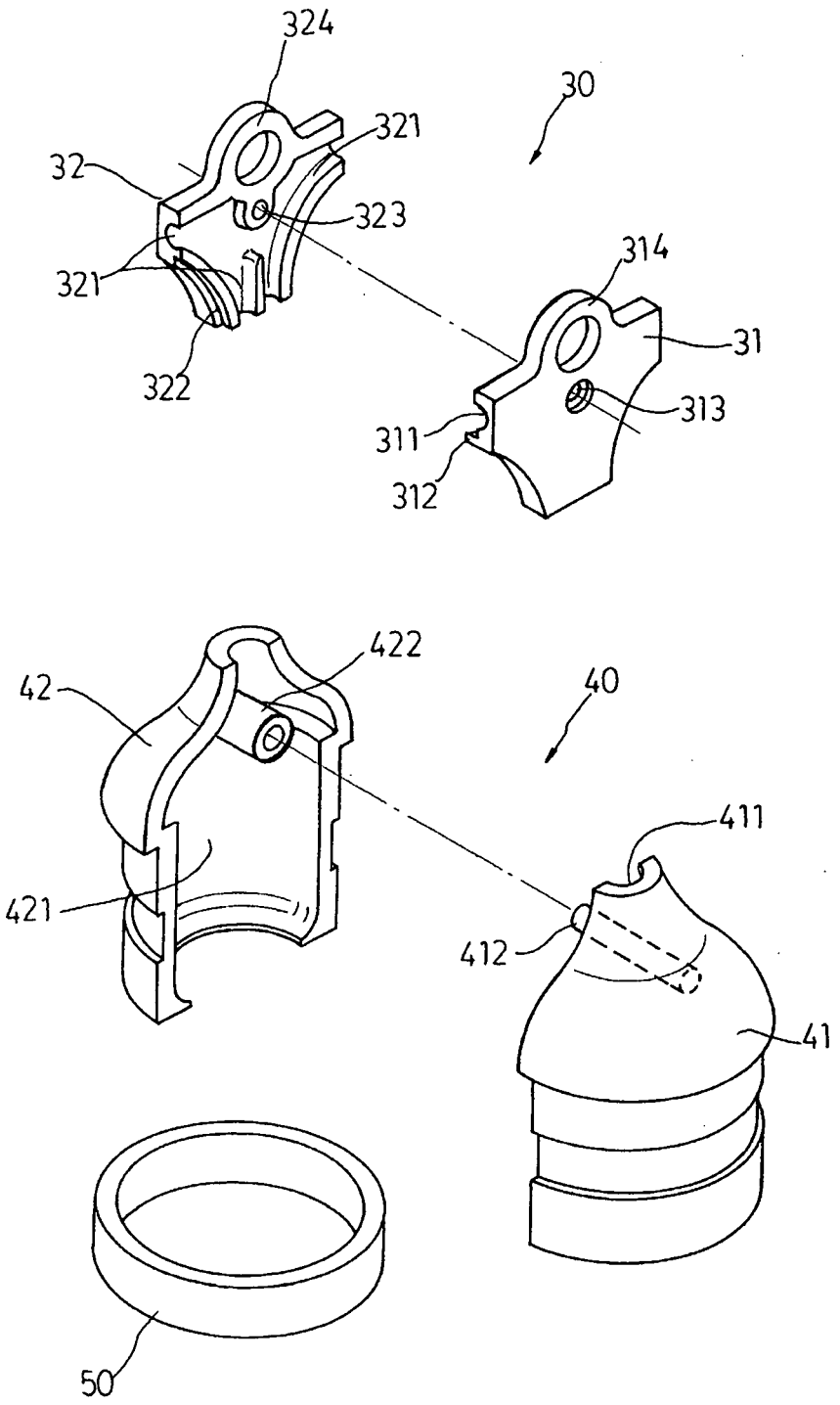
FIG. 2 is an exploded view of a clip cover structure according to the present invention.
Figure 3:
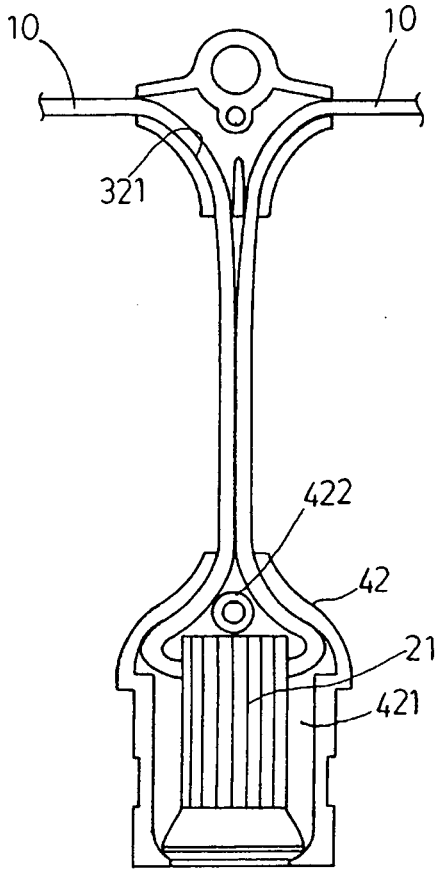
FIG. 3 is a schematic view of a structure configuration pattern of the implementation of the clip cover of the present invention on a C-type light string.
Figure 4:
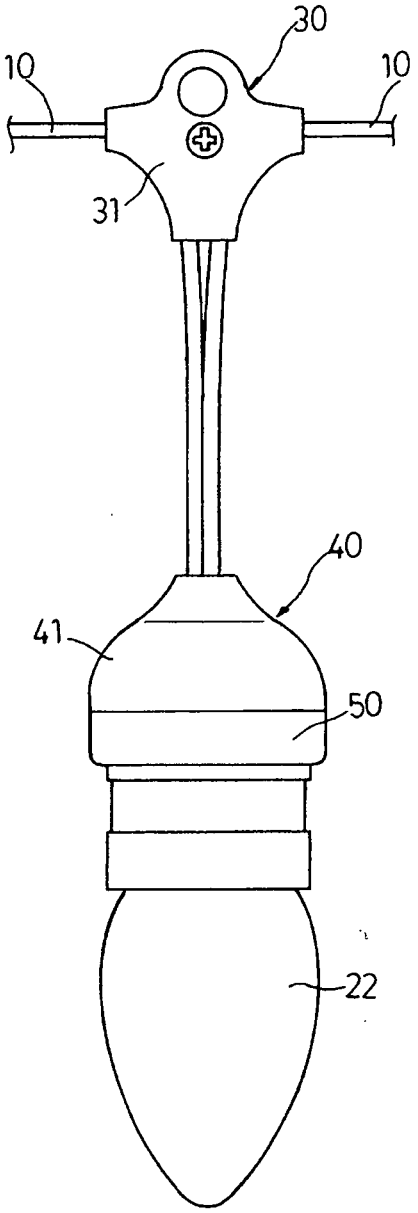
FIG. 4 is a schematic view of an appearance pattern of the clip cover of the present invention while being implemented on a C-type light string.
Figure 5:
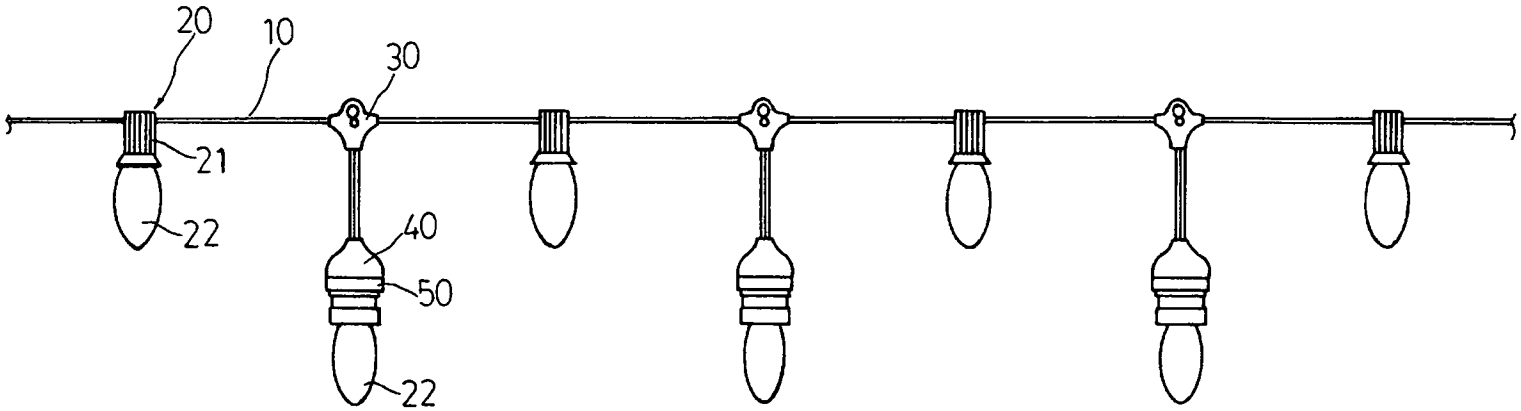
FIG. 5 is a schematic view of a configuration pattern of the implementation of the clip cover of the present invention on a C-type light string

The present invention provides a clip cover structure for a C-type light string, which is an auxiliary accessory exclusively used for the C-type light string. Referring to FIG. 2, the clip cover mainly includes a wire cover 30, a lamp cover 40 and a bundle cover 50, wherein the wire cover 30 is constituted by a first front cover 31 and first rear cover 32, on the top ends of which a hook ring 314, 324 is respectively formed. Furthermore, two curved wire grooves 311, 321 which is inclined downward and toward the center from the two sides are respectively formed on the positions of the front cover 31 and rear cover 32 corresponding to each other, wherein a flange 312 is formed on each outer side of the wire groove 311 of the front cover 31, and a notch 322 is then formed on each outer side of the wire groove 321 of the rear cover 32. Furthermore, a through hole 313, 323 is respectively configured at the positions of the centers of the first front cover 31 and first rear cover 32 corresponding to each other. The lamp cover is constituted by semicircular second front cover 41 and semicircular second rear cover 42, where an accepting space 411, 421 with a smaller opening at the top and larger opening at the bottom is respectively defined inside the second front cover 41 and second rear cover 42, where a positioning rod 412 is formed on the accepting space 411 of the second front cover 41, and a positioning seat 422 corresponding to the positioning rod 412 is formed on the accepting space 421 of the second rear cover 42. Furthermore, the bundle cover 50 is a circular collar with an inner diameter slightly larger than the outer diameter of the bottom of the lamp cover 40.

Referring to FIGS. 2 to 5, the clip cover of the present invention is applied to a light string constituted by combining an electric wire 10 with a plurality of C-type lamp 20 in series; the segments of the electric wire 10 at the left, right sides of one of the C-type lamps 20 of the light string are respectively placed into the wire groove 321 of the first rear cover 32, and the first front cover 31 is then covered with the rear cover 32 together, allowing the first front cover 32 to be joined and fixed to the first rear cover 32 by engaging the flanges 312 with the corresponding notches 322 in such a way to clip the segments of the electric 10 inside the wire grooves 311, 321 of the first front cover 31 and first rear cover 32 of the wire cover 30. Thereafter, the electric wire 10 is pulled down below the wire cover 30 a certain length, allowing the C-type lamp 20 to be hung perpendicularly below the wire cover 30. Next, the first front cover 31 and first rear cover 32 are locked together and the wire 10 thus is clamped tightly by passing a bolt through the through holes 313, 323 and then engaged with a nut. Furthermore, the lamp socket 21 of the C-type lamp 20 together with a small section of bent electric wire 10 is placed inside the accepting space 421 of the second rear cover 42, and the second front cover 41 is then jointed with the rear cover 42, allowing the lamp socket 21 of the C-type lamp 20 together with the small section of bent electric wire 10 to be clipped inside the lamp cover 40. Furthermore, the bundle cover 50 is put around the lamp cover 40 tightly, allowing the front cover 41 to be engaged with the rear cover 42 firmly. Finally, the lamp bulb 22 is placed in from the bottom face of the lamp cover 40 to engage with the lamp socket 21. Thereupon, several lamps hung perpendicularly downward can be configured on a monotonic C-type light string through the clip cover structure mentioned above, allowing the light string to be formed into a curtain-like light string so as to enable the C-type light string to have multiple use performance.

I claim:

1. A [clip cover structure for a] light string *cover structure*, comprising a wire cover [constituted by] *having* first front and rear covers, a lamp cover [constituted by] *having* second front and rear covers that are semicircular and an annular bundle cover, and combined with an electric wire configured with a plurality of lamp sockets and lamp bulbs, the lamp bulbs being respectively combined with the lamp sockets to form bulb-socket assemblies to each of which segments of the electric wire [are] connected at two sides thereof, wherein portions of the segments of the electric wire that are distant from the bulb-socket assembly are [clipped] *contained* inside said wire cover to allow the segments of said electric wire to be pulled away from said wire cover a certain length, allowing the bulb-socket assembly to be set at a distance from said wire cover; *wherein* said lamp socket of the bulb-socket assembly and a section of each of segments of the electric wire that are adjacent to and directly connected to the lamp socket are further [covered, clipped and fixed] *contained* inside said lamp cover through said second front and rear covers of said lamp cover tightly;

wherein the lamp cover [comprises] *includes* an interior forming an accepting space in which the lamp socket and the sections of the segments of the electric wire that are directly connected to the lamp socket are received and retained, *wherein* the interior [comprising] *includes* a lower chamber that receives the lamp socket therein and a second chamber that receives the sections of the segments of the electric wire that are directly connected to the lamp socket therein, wherein the second chamber [is larger in size] *has a diameter larger* than *a diameter of* the lower chamber in order to accommodate a bending of each of the sections of the segments of the electric wire; and wherein the second front and rear covers of the lamp cover are combinable to define, therebetween, the accepting space of the lamp cover, which has a first opening in a top of the lamp cover and a second opening, which is larger than the first opening and is formed in a bottom of the lamp cover, the first and second openings being in communication with the accepting space; *wherein* a positioning rod is formed at a position of said accepting space of said second front cover close to a top thereof, and a positioning seat at a position of said accepting space of said second rear cover corresponding to said positioning rod; *wherein* said lamp socket of the sections of the segments of the electric wire are received and retained in said accepting space by means of said second front cover being [covered] *engaged* with said second rear cover such that said lamp [socked] *socket* of the bulb-socket assembly and the sections of the segments of the electric wire that are directly connected to the lamp socket are covered [and clipped] inside said lamp cover by engaging said positioning rod with said positioning seat.

2. The structure according to claim 1, wherein [said wire cover is constituted by said first front and rear covers,] a curved wire groove[s] inclined downward and toward the center from the two sides is respectively formed at positions of said first front cover and first rear cover corresponding to each other; *wherein* a flange is formed on each outer side of said wire groove of said first front cover, and a notch *is formed on* each outer side of said wire grove of said first rear cover; *wherein* a through hole is respectively configured at positions of the centers of said first front and rear covers corresponding to each other; *wherein* the segments of the electric wire that are connected to the lamp socket at the two sides of the bulb-socket assembly are respectively placed in said wire groove of said first rear cover, and said first front cover is covered with said first rear cover together, allowing said first cover to be joined and fixed to said first rear cover by engaging said flanges with said corresponding notches to cover and clip the segments of the electric wire inside said wire grooves of said first front and rear covers; and *wherein* said first front cover and first rear covers are locked together by passing a bolt through said through holes to be engaged with a nut.

3. The structure according to claim 2, wherein a hook ring is respectively formed on top ends of said first front cover and first rear cover of said wire cover.

4. The structure according to claim 1, wherein said bundle cover is a circular collar with an inner diameter slightly larger than an outer diameter of a bottom of said lamp cover, said bundle cover is put around said lamp cover tightly after said second rear cover is covered with said second front cover together, allowing said second front cover to be engaged with said second rear cover firmly, and said lamp bulb is finally placed in the accepting space from a bottom face of said lamp cover and engaged with said lamp socket.

*5. A light string cover structure, comprising:*

*a wire cover having a first front cover and a first rear cover defining a first accepting space therebetween; and*

*a lamp cover having a second front cover and a second rear cover defining a second accepting space therebetween to contain a lamp socket and a first segment of at least two electric wires directly connected to said lamp socket,*

*wherein said second front and rear covers form a top opening of said lamp cover to allow a second segment of said at least two electric wires to extend outside of said lamp cover,*

*wherein said second segment of said at least two electric wires is distant from said first segment of said at least two electric wires and contained in said first accepting space of said wire cover, and wherein a positioning rod is formed near a top side of said second front cover within said second accepting space, and a positioning seat is formed at a position corresponding to said positioning rod on said second rear cover within said second accepting space such that engaging said positioning rod and said positioning seat allows said lamp socket and said first segment of said at least two electric wires to be contained in said lamp cover.*

*6. A light string cover structure, comprising:*

*a lamp cover covering a lamp socket and a first segment of at least two electric wires directly connected to said lamp socket; and*

*a wire cover covering a second segment of said at least two electric wires, wherein said second segment is configurable to move in and out of said wire cover such that said wire cover is positioned at an adjustable distance from said lamp cover and wherein a positioning seat is formed near a top side of said lamp cover to position said first segment of said at least two electric wire within said lamp cover, and wherein said lamp cover includes a front cover and a rear cover, and wherein said positioning seat is formed on said rear cover and a positioning rod is formed on said front*

*cover such that when said positioning rod is placed inside said positioning seat said front cover is engaged with said rear cover.*

*7. The structure according to claim 6, wherein said front cover and said rear cover forms a top opening of said lamp cover to allow said second segment of said at least two electric wires to extend outside of said lamp cover.*

*8. The structure according to claim 6, further comprising a securing mechanism configurable to form on said lamp cover to tighten said engagement of said front and rear covers.*

*9. The structure according to claim 6, wherein said front and rear covers further form a bottom opening of said lamp cover to allow a lamp bulb to be connected to said lamp socket.*

*10. The structure according to claim 6, wherein said front and rear cover defines an accepting space with a first chamber and a second chamber, wherein said first chamber receives said lamp socket, and said second chamber receives said first segment of said at least two electric wires, and wherein said second chamber allows said first segment of said at least two electric wires to be bent therewithin.*

*11. The structure according to claim 10, wherein said first chamber has a diameter smaller than a diameter of said second chamber.*

*12. The structure according to claim 10, wherein said first chamber has a diameter larger than a diameter of said second chamber at the point where said first segment of said at least two electric wires enters the second chamber.*

* * * * *